Patented Feb. 20, 1951

2,542,850

UNITED STATES PATENT OFFICE 2,542,850

DIAZOTYPES CONTAINING 4-OXYQUINOLONE-2 DERIVATIVES

William H. von Glahn, Loudonville, and Lester N. Stanley, Delmar, N. Y., assignors to General Aniline & Film Corporation, New York, N. Y., a corporation of Delaware No Drawing. Application November 6, 1948, Serial No. 58,808

8 Claims. (Cl. 95—6)

This invention relates to diazotype photo-reproduction media, to the light sensitive materials utilized in the production thereof, and more particularly to the azo or coupling components of that class which are capable of yielding prints of a dark shade.

It is known that the diazotype process involves treating a base such as paper with a sensitizing composition containing a light sensitive diazo compound, exposing the treated base through a pattern or transparency containing the design to be copied and subjecting the exposed material to development by means of an alkali in the presence of a coupling component capable of reacting with the undecomposed diazo compound to yield an azo dyestuff image. Although many sources of actinic light are employed for the purpose of exposing the sensitized material and decomposing the diazo compound in the exposed area to a form which will not couple with a coupling component, those sources of actinic light are preferred which are rich in the ultraviolet band of from 3600 Å. to 4200 Å. This is a positive reproduction process since the dye components in the exposed area are rendered incapable of forming a color after exposure, and the parts which are reproduced are those which have been protected from exposure to the actinic light by the lines or other opaque areas of the original. In one modification of the process the sensitizing composition for the base contains only the diazo compound, the azo coupling component being applied separately at the time of development. In another and more generally used modification the sensitizing composition for the base contains both the diazo compound and the azo coupling component, azo dye formation taking place after exposure by subjecting the exposed sensitized material to the action of a volatile alkaline agent, preferably ammonia vapors.

The exacting requirements of the diazotype art set rather rigid standards for the selection of the dye components to be used in the sensitizing composition for production of a diazo-type photoreproduction material. The dye components must be capable of producing dyes which have good permanency and substantivity for the base material. The dyes must have good wash-fastness properties so that the image will not be blurred by bleeding of the dye into the background. They must also be fast to light and to offset, that is, rubbing off of the dye by abrasive means with which the print may be contacted. This last property is particularly important where the diazotype prints are intended for use as transition originals in the reproduction of further copies. In the two-component process the sensitizing materials must be stable to precoupling or spontaneous coupling prior to use, and against oxidation. Lack of stability to precoupling and oxidation results in an over-all production of discoloration in the background of the ultimate prints and consequent loss of contrast between the image and the background.

In all positive photoprinting processes, particularly where final copies are being made, it is highly desirable to produce a copy which will have a distinctive color, preferably a dark shade on a clear background. The sensitivity of the diazo compound to actinic light, and in the case of two-component diazotypes the stability of both the diazo compound and the azo component against precoupling are the principal contributing factors to the provision of a clear background. Oxidation of the coupling component either before or after exposure and development and oxidation of the photolysis product of the diazo compound also contribute to the formation of discoloration in the background.

It has been found in practice that there are but few coupling components which meet the exacting requirements of the diazotype art. Generally, the art has resorted to the utilization as coupling components of armomatic polyhydroxy compounds, particularly resorcinol and resorcinol derivatives, for the production of colors in the yellow and brown range, and phloroglucinol or naphthols such as 2,3-dihydroxy naphthalene for the production of colors in the blue range. While these couplers meet many of the requirements and are generally satisfactory, they suffer from the disadvantage that they have a marked tendency to precouple on storage. There has been some suggestion to use pyrazolones, but this has not been widely adopted. Hydroxy pyridones have been suggested in Patent No. 2,431,190, but have not been used to any extent. Other than these suggestions, it is rare to find any suggestion that heterocyclic type couplers be utilized for the production of diazotype prints.

We have now found a new class of couplers, heterocyclic in nature, which are known as the 4-oxyquinolone-2 family which have all of the necessary properties for two-component as well as one-component diazotypes and will produce images of a dark shade when reacted with a diazo compound of the class generally used as the light sensitive element in diazotypes. The colors which are produced by this class of coupling components when reacted with such diazo compounds as the mono-diazo derivatives of p-phenylene diamines range in color from bright maroon to dark blue. The colors are particularly fast to light, washing and offset. The light sensitive coating prior to use is very stable against pre-coupling when used in a two-component system, and the 4-oxyquinolone-2 coupling components do not easily oxidize to off-color products.

The 4-oxyquinolone-2 compounds and their N-substituted derivatives are represented by the following formula:

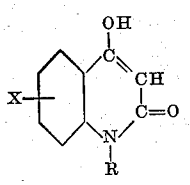

wherein R represents hydrogen, alkyl (such as methyl, ethyl, propyl and butyl), hydroxyalkyl (such as hydroxyethyl), aryl (such as phenyl and substituted phenyl, tolyl, and the like), and aralkyl such as benzyl and X represents hydrogen or substituents which do not influence solubility to any great extent, such as halogen, alkoxy and lower alkyl.

4-oxyquinolone-2 is a well known compound, desmotropic with 2,4-dioxyquinoline, described in Beilstein 21, 171. The N-substituted 4-oxyquinolone-2 compounds are readily produced in accordance with the method of German Patent No. 287,803 (Frdl. 12, 153). The ring-substituted compounds, wherein X of the above formula stands for a substituent which does not influence solubility, are known and may be prepared by methods analogous to those used in the preparation of 4-oxyquinolone-2 and its N-substituted products (see Ber. 52B, 1086).

The diazo components which are utilized in the production of the diazotypes with the 4-oxyquinolone-2 compounds as developers or coupling components may be any of those diazo compounds generally employed in the diazotype art, such as diazo compounds derived by diazotization of aminonaphthol sulfonic acids or preferably those derived by diazotization of p-phenylene diamines, particularly those wherein the amino group in para-position to the diazo group is substituted at least once by such groups as alkyl, alkoxyalkyl, aryl, aralkyl, alkylol, cyclo aliphatic and heterocyclic radicals. The diazo compounds may be utilized as such or in the form of their stabilized double salts, such as the double salt of the diazonium chloride with zinc chloride, cadmium chloride, tin chloride, or the like, the double salt of the diazonium chloride with fluoroborates or the complex of the diazo with alkyl or aryl sulfonates, such as the methyl, ethyl, propyl and phenyl sulfonates or as the acid sulfates of the diazo. The following table comprises a list of amines from which suitable diazo compounds may be obtained by diazotization and combination with such stabilizing complex salt-forming compounds as may be desired:

2,5-diethoxy-4-(4'-ethoxyphenyl) aniline
p-(N-hydroxyethyl-N-methylamino) aniline
p-(N-hydroxyethyl-N-ethylamino) aniline
p-Aminodiphenylamine
p-Ethylamino-m-toluidine
p-Dimethylamino-o-toluidine
p-Diethylamino-o-phenetidine
p-Dimethylamino-o-phenetidine
4-benzoylamino-2.5-diethoxyaniline
2-amino-5-dimethylaminobenzoic acid p-Diethylaminoaniline
p-Dimethylaminoaniline
p-(N-benzyl-N-ethylamino) aniline
p-Dihydroxyethylaminoaniline
p-(N-ethyl-N-hydroxyethylamino)-o-toluidine
p-Dihydroxyethylamino-o-chloroaniline
p-Ethylaminoaniline
p-Phenylenediamine The sensitizing compositions may contain, in addition to the diazo compound and the azo coupling component, the usual adjuncts, such as metal salts for intensification of the dye image as, for example, aluminum sulfate, titanium ammonium fluoride, nickel sulfate and zinc chloride; stabilizing agents such as thiourea, naphthalene disulfonic acid, and the like; stabilizing acids for retarding precoupling, such as citric acid, boric acid and tartaric acid; hygroscopic agents, such as ethylene glycol, glycerine and dextrin; sulfonates, such as isopropyl alcohol; and wetting agents, such as saponin. The base material on which the light sensitive layer is coated may be a sheet, film or web-forming material, such as cotton, linen, rayon or the like, paper, film of cellulosic derivatives and other materials, such as polyvinyl derivatives and superpolyamides.

While it is preferred that the 4-oxyquinolone-2 compounds and their N-substituted derivatives be incorporated in the sensitizing compositions in accordance with the two-component diazotype method, nevertheless, the invention may be applied also according to the one-component method, wherein the sensitized layer contains the diazo compound as the only dye component and the coupling component is then applied as a constituent of a developing solution to effect the development of the exposed image.

Since the 4-oxyquinolone-2 compounds of this invention have low aqueous solubilities, it is necessary to use a greater amount of solvent alcohol in preparing coating and developing solutions containing them. It is likewise preferable, in order to obtain more rapid and complete development (thus producing brighter and stronger shades) to run the ammonia developing chamber for two-component development at a higher temperature than that which is ordinarily used in commercial diazotype development.

The invention is further illustrated by the following examples, but it is understood that it is not restricted thereto, as the examples are for the purpose of illustration and are not intended to limit the scope of the invention as defined in the claims.

*Example I*

Diazotype paper stock made of 100% rag paper is coated with an aqueous solution containing the following ingredients per 100 cc. of solution:

1.3 g. N-methyl-4-oxyquinolone-2
2.2 g. diethylaminobenzene-p-diazo-$ZnCl_2$ double salt
8.0 g. citric acid
4.0 g. thiourea
5.0 g. $ZnCl_2$
10.0 cc. ethyl alcohol The resulting sensitized paper, after exposure under a pattern and development in the usual ammonia developing machines, yields prints of an attractive bluish-violet shade having well defined lines against a pure white background. Prior to exposure and development, the sensitized paper has excellent stability to precoupling in storage, even under the extreme conditions of an accelerated aging test. After being subjected to the severe temperature and humidity conditions of the accelerated aging test, the prints obtained upon subsequent exposure and development, show only very slight residual color in the background.

*Example II*

Diazotype paper stock of the type used in Example I is coated with an aqueous solution containing the following ingredients per 100 cc. of solution:

1.2 g. 4-oxyquinolone-2
2.4 g. N-ethyl-N-hydroxyethyl-m-toluidine-p-diazo-$ZnCl_2$ double salt
8.0 g. citric acid
4.0 g. thiourea
5.0 g. $ZnCl_2$
10.0 cc. ethyl alcohol The procedure for processing and testing the sensitized paper of this example is the same as in Example I. Its stability properties against precoupling are of the same degree as the diazotype material of Example I. The prints are obtained in a lavender-blue shade on a white background having well-defined lines.

*Example III*

Diazotype paper stock of the same type as used in Example I is coated with an aqueous solution containing per 100 cc. of solution:

1.6 g. N-2′-methoxyphenyl-4-oxyquinolone-2
2.3 g. N-hydroxyethyl-N-methylaniline-p-diazo-$ZnCl_2$ double salt
8.0 g. citric acid
4.0 g. thiourea
5.0 g. $ZnCl_2$
10.0 cc. ethyl alcohol.

The procedure for processing and testing the sensitized paper of this example is the same as in Example I. Its stability properties against precoupling are of the same degree as the diazotype material of Example I. The prints are obtained in a deep rich blue shade on a white background having well-defined lines.

*Example IV*

Diazotype paper stock of the same type as used in Example I is coated in the same manner as in that example with an aqueous solution containing the following ingredients per 100 cc. of solution:

1.3 g. N-methyl-4-oxyquinolone-2
2.0 g. N-ethylaniline-p-diazo-$CdCl_2$ double salt
8.0 g. citric acid
4.0 g. thiourea
5.0 g. $ZnCl_2$
10.0 cc. ethyl alcohol The procedure for processing and testing the sensitized paper of this example is the same as in Example I. Its stability properties against precoupling are of the same degree as the diazotype material of Example I. The prints are obtained in a reddish violet shade on a white background having well-defined lines.

*Example V*

Diazotype paper stock of the same type as used in Example I was coated with an aqueous solution containing the following ingredients per 100 cc. of solution:

1.4 g. N-hydroxyethyl-4-oxyquinolone-2
2.4 g. N,N-diethyl-m-phenetidine-p-diazo-$ZnCl_2$ double salt
8.0 g. citric acid
4.0 g. thiourea
5.0 g. $ZnCl_2$
10.0 cc. ethyl alcohol The procedure for processing and testing the sensitized paper of this example is the same as in Example I. Its stability properties against precoupling are of the same magnitude as the diazotype material of Example I. The prints are obtained in a deep rich blue shade on a white background, having well-defined lines.

*Example VI*

Diazotype paper stock of the same type used in Example I is coated with an aqueous solution containing per 100 cc. of solution:

3.5 g. 2,5-diethoxy-N-benzoylaniline - p - diazo - $ZnCl_2$ double salt
2.0 g. citric acid
4.0 g. thiourea
5.0 g. $ZnCl_2$ The resulting light sensitive paper, after being dried in the usual manner, is exposed to light under a pattern. The exposed sensitized paper is then developed by application of a mildly alkaline solution of N-benzyl-4-oxyquinolone-2. Prints are obtained in a bright maroon shade on a white background having well-defined lines. These prints have good properties of light fastness, fastness to washing and fastness to offset.

*Example VII*

Diazotype paper stock of the same type as employed in Example I is coated with a sensitizing aqueous solution containing the following ingredients per 100 cc. of solution:

1.3 g. 5-methyl-4-oxyquinolone-2
2.2 g. diethylaminobenzene-p-diazo-$ZnCl_2$ double salt
8.0 g. citric acid
4.0 g. thiourea
5.0 g. $ZnCl_2$
10.0 cc. ethyl alcohol The sensitized paper obtained from the coating solution of this example has the same properties as that obtained in accordance with Example I and the shade of the print obtained after exposure and development is of a similar bluish-violet hue.

In the accelerated aging tests used to determine the stability of the diazotype coatings of these examples against precoupling and decomposition of the dye components, the sensitized carrier, after the usual drying process, is subjected to a temperature of 50° C. for 48 hours at a relative humidity of 50%.

We claim:

1. Light sensitive diazotype material comprising a base carrying a light sensitive diazo compound and a coupling component selected from the class consisting of those having the formula:

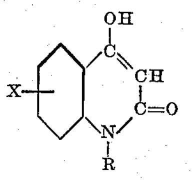

wherein R is a member of the group consisting of hydrogen, alkyl, hydroxyalkyl, aryl and aralkyl and X is a member of the group consisting of hydrogen, halogen, alkoxy and lower alkyl.

2. Light sensitive diazotype material comprising a base carrying the light sensitive mono-diazo compound of a p-phenylene diamine and a coupling component selected from the class consisting of those having the formula:

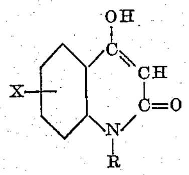

wherein R is a member of the group consisting of hydrogen, alkyl, hydroxyalkyl, aryl and aralkyl and X is a member of the group consisting of hydrogen, halogen, alkoxy and lower alkyl.

3. Light sensitive diazotype material comprising a base carrying a light sensitive mono-diazo compound of a p-phenylene diamine and N-methyl-4-oxyquinolone-2.

4. Light sensitive diazotype material comprising a base carrying a light sensitive mono-diazo compound of a p-phenylene diamine and 4-oxyquinolone-2.

5. Light sensitive diazotype material comprising a base carrying a light sensitive mono-diazo compound of a p-phenylene diamine and N-2′-methoxyphenyl-4-oxyquinolone-2.

6. Light sensitive diazotype material comprising a base carrying diethylaminobenzene-p-diazo in combination with N-methyl-4-oxyquinolone-2.

7. Light sensitive diazotype material comprising a base carrying N-ethyl-N-hydroxyethyl-m-toluidine-p-diazo in combination with 4-oxyquinolone-2.

8. Light sensitive diazotype material comprising a base carrying N-hydroxyethyl-N-methylaniline-p-diazo in combination with N-2′-methoxy phenyl-4-oxyquinolone-2.

WILLIAM H. VON GLAHN.
LESTER N. STANLEY.

REFERENCES CITED

The following references are of record in the file of this patent:

UNITED STATES PATENTS

| Number | Name | Date |
|---|---|---|
| 1,969,463 | Holzach et al. | Aug. 7, 1934 |
| 2,431,190 | Morgan | Nov. 18, 1947 |

OTHER REFERENCES

Spencer: "Photographic Applications of Diazo Compounds," The Photographic Journal, December 1928, pp. 490 to 496; pp. 490 and 491 cited.